United States Patent [19]

Karpinia

[11] Patent Number: 4,909,237
[45] Date of Patent: Mar. 20, 1990

[54] COMBINED CHARCOAL MAKER AND STARTER

[76] Inventor: Walter Karpinia, 600 W. Lakeridge Dr., Eagle River, Ak. 99577

[21] Appl. No.: 329,186

[22] Filed: Mar. 27, 1989

[51] Int. Cl.$^4$ .............................................. F24B 3/00
[52] U.S. Cl. ..................................... 126/25 B; 202/99
[58] Field of Search .............. 126/25 R, 25 B; 202/99

[56] References Cited

U.S. PATENT DOCUMENTS

| | | | |
|---|---|---|---|
| 4,190,035 | 2/1980 | Beusen | 126/99 A |
| 4,417,565 | 11/1983 | Karpinia | 126/25 B |
| 4,630,593 | 12/1986 | Gremillion | 126/25 R |
| 4,706,643 | 11/1987 | Tyson | 126/25 B |

Primary Examiner—Carroll B. Dority
Attorney, Agent, or Firm—Michael J. Tavella

[57] ABSTRACT

A portable charcoal maker is disclosed for home use. The charcoal maker can also be used to start ordinary charcoal briquettes as well. The device consists of a tapered housing having a large cylindrical hopper placed on the top of the tapered housing. The device has a flared base for support. The junction of the flared base and the tapered housing forms a venturi that will accelerate the flow of air through the device. Up to two additional venturis can be added to the device by forming restrictions in the walls of the device. The additional venturis produce variable air pressures through the device which produce a high efficiency for combustion. Ordinary charcoal placed within the hopper will start and be ready for cooking in six to seven minutes, using only four pieces of newspaper to ignite the charcoal. To make charcoal, wood block are placed in the device and ignited. Once ignited, a lid is placed over the hopper to restrict the air flow through the device, which allows the wood to distill instead of burn. The device will typically distill 10-12 pounds of wood in about 30 minutes. The charcoal produced will be started and ready to cook immediately. The device includes a heat shield to protect the user and to prevent the hopper from overheating and possible burn through. The device also includes a handle to allow the finished charcoal to be dumped from the device into a grill.

12 Claims, 2 Drawing Sheets

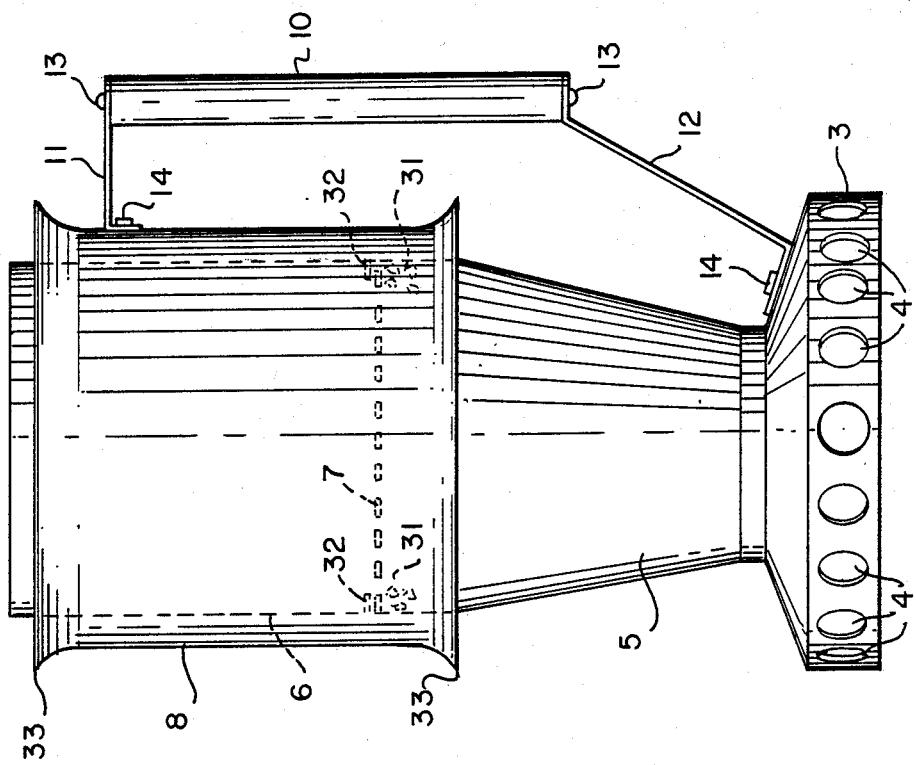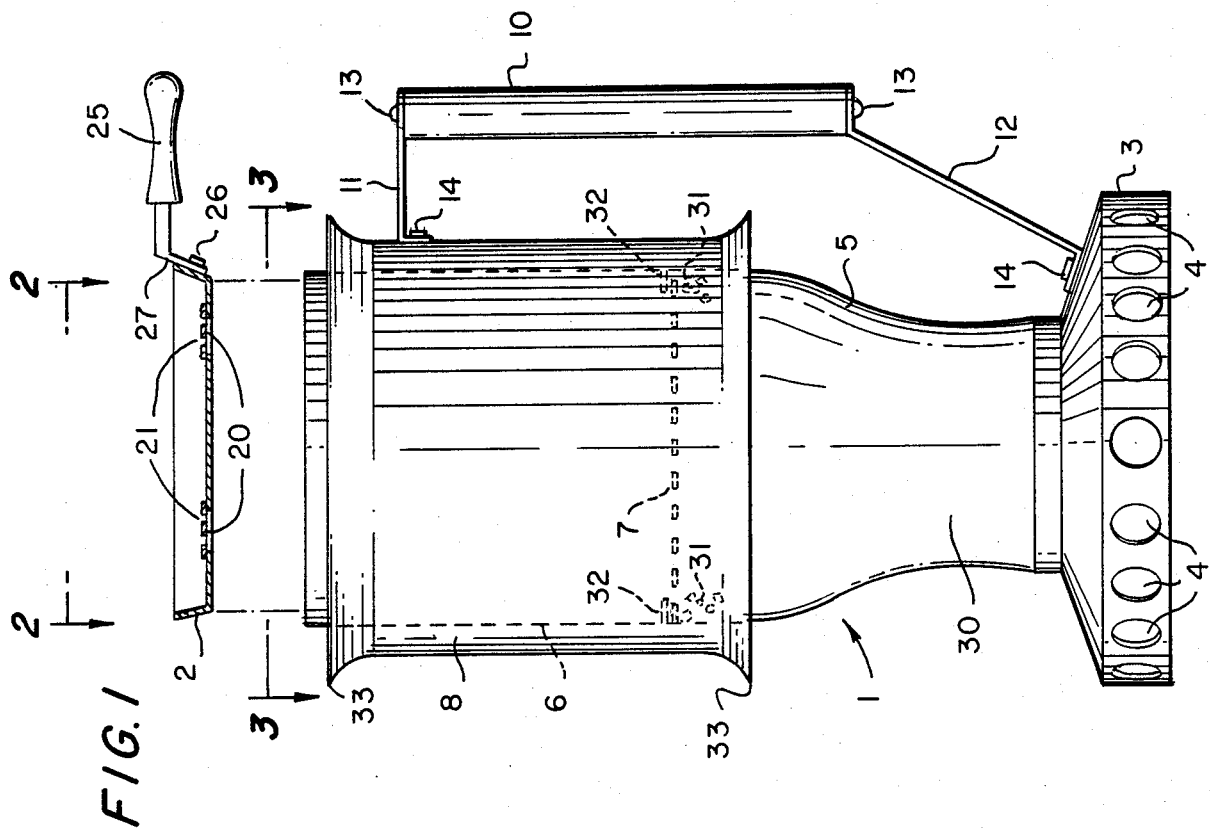

COMBINED CHARCOAL MAKER AND STARTER

This invention is related to portable charcoal makers and particularly to combined, portable charcoal makers and starters that control the acceleration, pressure and quantity of air in the process of the manufacture or ignition of charcoal.

BACKGROUND OF THE INVENTION

Charcoal cooking, especially barbecue, is popular worldwide. In recent years, use of exotic cooking woods, such as mesquite, have grown in popularity. Many different types of charcoal cookers, stoves and grills are now produced, as well as charcoal starter fluid and bagged charcoal, which account for hundreds of millions of dollars in sales and a wide variety of cooking techniques and portability.

Although many products exist for using charcoal, few, if any portable products are commercially available that enable home owners to make charcoal, safely and efficiently for immediate use in charcoal grills.

Charcoal is an amorphous, porous form of carbon made by the destructive distillation of almost any carbonaceous material, by applying high heat to the material and allowing little or no air passage.

Modern methods use retorts or kilns to carbonize the raw material. The residue is then collected and, when wood is used, pressed into the common briquette form. A method still used in Southeast Asia produces charcoal by stacking wood in large piles, covered with earth. A fire is then started through a small opening left in the top of the stack. The wood is allowed to smolder for about 10 days, after which the fire is smothered and the charcoal is collected. Both procedures are lengthy and laborious.

For home use, the charcoal process must take minutes instead of days. The present invention provides a device that will make charcoal from wood blocks in approximately thirty minutes.

It is an object of this invention to provide a safe, fast, convenient, method of making charcoal from wood pieces in a portable device for immediate use.

It is another object of this invention to produce a charcoal maker that can also efficiently start commercial charcoal for immediate cooking use.

BRIEF DESCRIPTION OF THE INVENTION

U.S. Pat. No. 4,417,565, to Karpinia, discloses a charcoal starter that uses a venturi system to accelerate air flow through the starter, thereby materially increasing the efficiency of the starter. This device quickly develops and generates extremely high temperatures. The heat shield on the device, protects the user and acts to cool the device to prevent a burn through of the hopper walls during combustion. The instant device is produced by modifying the Karpinia starter. A device that will produce charcoal from wood pieces for immediate use in a charcoal cooker. The device can also be used as a starter, with the additional equipment removed, as disclosed in the patent cited above.

The charcoal maker consists of a tapered housing that has a wide base and a conical body. A fire chamber formed at the top of the conical body to hold the wood. The charcoal is produced in the fire chamber. The wood blocks are placed on a steel grate. The air flow through the device is controlled by a fitted, removable top, to allow distillation of the wood. The top is vented with controlled doors to provide precise control over the process. A heat shield is formed around the first chamber to protect the user from the heat of the device and to protect the walls of the fire chamber from incineration or burn through.

A handle is provided to allow the device to be moved and to dump the completed charcoal from the maker into a charcoal grill for use.

Heat is provided by starting a controlled fire using a tinder, e.g., sheets of crumpled newspaper, placed within the body. A number of holes are placed around the base to ensure adequate combustion air. The newspapers will ignite the wood on the bottom of the fire chamber. The venturi system will sustain this fire at a high temperature. When the top is fitted on the device, the combustion will be controlled allowing distillation and preventing rapid consumption of the wood. Without the top, the wood would quickly burn down to ash within the fire chamber and would be unusable for cooking.

BRIEF DESCRIPTION OF THE DRAWINGS

FIG. 1 is a front view of the preferred embodiment, showing the removable lid.

FIG. 4 is a side view of a second embodiment of the invention.

DESCRIPTION OF THE PREFERRED EMBODIMENTS

Figure 2:
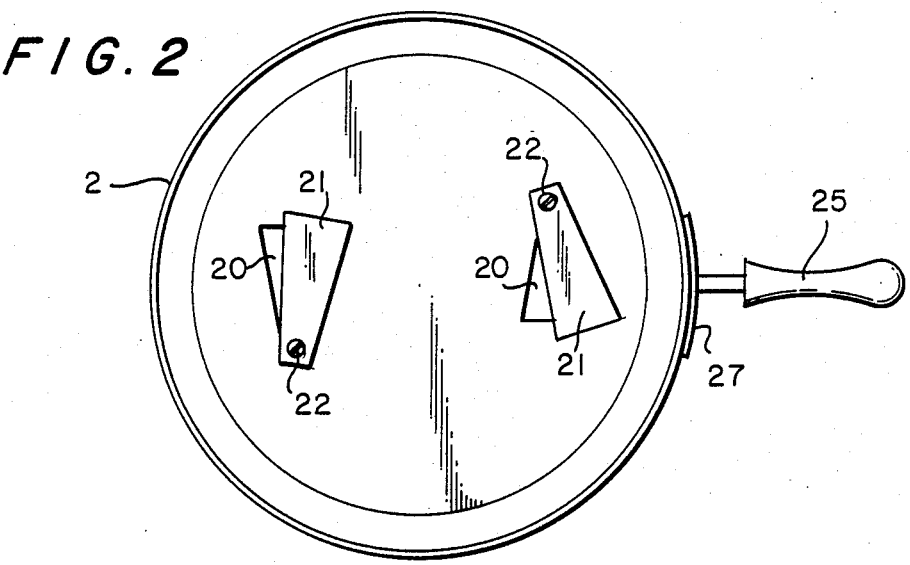
FIG. 2 is a top view of the lid, along the lines 2—2.

Referring to the drawing figures, and particularly to FIG. 1, the charcoal maker consists of two parts. The first, is the venturi hopper unit 1. The second part is the removable lid 2. The venturi hopper unit 1 has a base 3 that has a number of evenly spaced air holes 4 as shown. At least two holes should be provided to ensure there is enough combustion air for the unit. The base 3 is tapered as shown and is designed to fit into the hopper support 5. The hopper support 5 is also tapered, but opposite from the taper of the base 3. The junction of the base 3 and the hopper support 5 forms a venturi, or a narrowing of the air channel, at the junction. In the preferred embodiment, the walls of the hopper support are rolled using standard sheet metal working techniques such that the inner diameter of the hopper support 5 is narrower than the venturi located at the base junction, discussed above. The narrow point 30, forms a second venturi. A third venturi is also included in the preferred embodiment. This venturi consists of a roll 31 made in the sheet metal at the top of the hopper support 5 as shown. The roll 31 provides the final level of acceleration to the air before it reaches the loading hopper. This third venturi 31 also acts as a support for the grate 7. If this venturi is not included, the grate 7 will need alternative means of support, such as rivets, as discussed below. The device can be constructed with any combination of the three venturis (however, the first venturi at the base junction must be used). For example, FIG. 4 shows the device with a straight wall for the support housing and having the third venturi only installed. Other combinations are obvious and can be gleaned from disclosure and the drawings.

The loading hopper 6 is formed on top of the hopper support 5, and in practice, both the hopper support 5 and the loading hopper 6 are typically formed from one piece of metal, they are described separately because they each have different functions, as will be described in greater detail below. A grate 7 separates the hopper support 5 from the loading hopper 6 and provides a platform to hold the wood pieces used to make the charcoal. In the preferred embodiment, the grate 7 is made from concrete reinforcing wire, having a 1 inch square mesh. Other similar materials and preformed screens and grates can be substituted to achieve the same result. At least two rivets 32 are provided as shown to hold the grate 7 in the hopper when the hopper is inverted. If needed, a third rivet 32 (the three rivets placed at 120 degree spacing) or even two additional rivets 32 (positioned at right angles to the first pair) can be used to further hold the grate 7.

Figure 3:
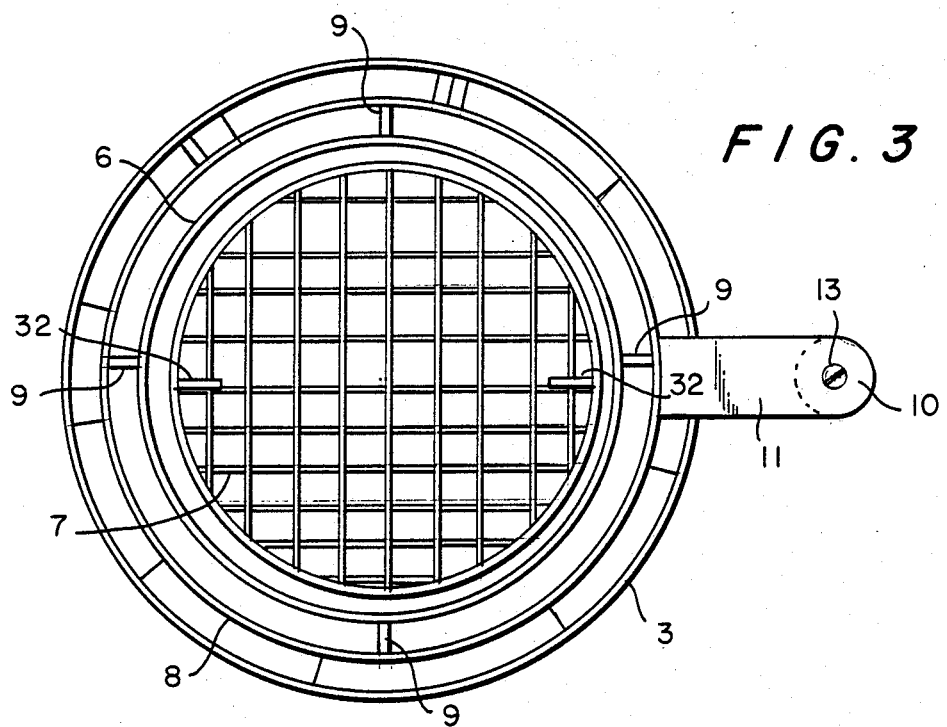
FIG. 3 is a top view of the charcoal maker along the lines 3—3.

A heat shield 8 is attached to the outer surface of the loading hopper 6 with metal tabs 9 as shown in FIG. 3. The heat shield is formed of sheet metal to protect the user and to assist in cooling the hopper. The curved edges 33 add strength to the heat shield 8 and act as stiffeners to ensure that the heat shield maintains its cylindrical shape through repeated use and storage. The heat shield 8 has two purposes. It shields the handle 10 (discussed below) from the heat produced by the unit so that a user can move the device to dump the charcoal and it also acts to keep the surface of the loading hopper 6 from becoming too hot and burning through during the distillation process.

The handle 10 can be formed of plastic, metal or wood. In the preferred embodiment, plastic is used because it has a high strength to weight ratio. Plastic can be colored and engraved to simulate wood grain, if desired. The handle 10 is attached to the unit 2 with two brackets, 11 and 12 as shown. The brackets 11 and 12 are attached to the handle 10 with self tapping screws 13, or other means common to the industry, as shown in FIG. 3. The brackets 11 and 12 are attached to the heat shield 8 and the base 3 respectively, with sheet metal screws 14 as shown. The brackets 11 and 12 can also be attached using nuts and bolts, or can be riveted or spot welded. In the preferred embodiment, sheet metal screws are used because the handle and brackets can be removed from the unit for packaging, which will result in a smaller box, and can be quickly installed by the user.

Referring now to FIGS. 1 and 2, a removable lid 12 is provided. The lid adequately seals the loading hopper 6 so that wood pieces placed in the loading hopper 6 are distilled instead of burned, thereby forming charcoal. The lid 2 is beveled as shown to ensure that the lid will fit tightly within the loading hopper 6 while eliminating the need for a flange to prevent the lid 2 from sliding down into the loading hopper 6 as the wood is distilled. The lid 2 can be made from a solid piece of metal; however, in the preferred embodiment, a hollowed out "pan" of metal is used. This shape provides all of the same benefits as the solid lid, but is also considerably lighter. To ensure progressive distillation, some air must be vented through the loading hopper 6, otherwise, the reaction will stop if the wood becomes too cool. To provide adequate air, two vents 20 are formed in the base of the lid 2 as shown. The vents are controlled by two vent covers 21 as shown. The vent covers 21 are attached to the lid with screws 22, or other means common to the industry, to allow the vent covers 21 to pivot to adjust the size of the vent opening. A handle 25 is also attached to the side of the lid 2 and is used to place and remove the lid 2 for use. The handle 25 is attached to the lid by rivets or screws 26 (if the handle is to be removed for shipping). The handle has a mounting plate 27 that sits against the lid 2 to ensure that the handle is stable and is held securely against the lid 2.

The device is used in two primary ways. First, it can be used to start commercial charcoal briquettes. The briquettes are loaded into the hopper and tinder, such as newspaper, is loaded into the hopper support. The newspapers are then ignited and in a few minutes, the briquettes are fully started, ready to use. The briquettes are then dumped from the device into a grill for cooking. No liquid or paste accelerators are needed.

The second use of the device is to make charcoal from wood. The wood used can be any species, however, hard woods tend to produce a lasting charcoal with little creosote residue. The wood should be cut into pieces approximately 1.5 to 2 inches square. After the blocks are placed in the hopper, tinder is loaded into the hopper support, as before, and ignited. When the lower pieces of wood have ignited, the lid is placed on the top of the hopper and the vents are adjusted to maintain the distillation without combusting the wood. Typically, the charcoal will be ready for use in approximately 30 minutes and will be ready for immediate use. The charcoal produced is intended for immediate use. Attempting to shut down the process to save the charcoal will produce a small quantity of charcoal pellets that, when later ignited, will burn too quickly for practical use.

The device is designed to produce between 2.5 and 3 pounds of charcoal. Because wood varies in moisture content and density, it is difficult to precisely determine the quantity of cut wood pieces that will produce a given quantity of charcoal in a given period of time. Although generally, between 8 and 15 pounds of wood with average density and moisture content can be distilled in approximately 30 minutes to produce 3 pounds of charcoal. Because of the variance in wood quality, the hopper in the preferred embodiment is approximately 20 inches tall by 15 inches in diameter. Height of the hopper can range between 18 and 24 inches, however, without making the device top heavy or cumbersome to use.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A portable charcoal maker, using cut wood pieces, being ignited by an ignition source, to produce charcoal comprising:
   (a) a cylindrical housing having a top and a bottom and having a hollow inside, forming a conduit said cylindrical housing having at least one ventilation hole placed within the bottom of the cylindrical housing;
   (b) at least one venturi means formed by said cylindrical housing intermediate said top and bottom;
   (c) a grate fixedly placed within said cylindrical housing above said venturi means to support the wood pieces;
   (d) a removable lid placed on the top of said cylindrical housing, said lid also having at least one ventilation hole placed therein; and (e) a heat shield, fixedly placed around the cylindrical housing to ensure a cooling air flow around the cylindrical housing to prevent overheating the cylindrical housing when the wood pieces are ignited and distilled into charcoal.

2. The charcoal maker of claim 1 wherein the venturi means comprises a rolled portion, forming a restricted air passage within the cylindrical housing.

3. The device of claim 1 further comprising a handle fixedly attached to the cylindrical housing.

4. The device of claim 3 further comprising a handle fixedly attached to said lid.

5. The device of claim 1 further comprising control means slidably attached to said lid to control the air flow through the vent in said lid.

6. A portable charcoal maker, using wood pieces being ignited by an ignition source, comprising:
   (a) a base, said base including a cylindrical wall having an open top and an end bottom, and having at least one hole in said wall;
   (b) a transition sleeve, said transition sleeve being circular and conical in shape, said transition sleeve being fixedly attached to said open top of said base, thereby sealing the open top of said base, said transition sleeve also having an outlet vent and extending upwardly;
   (c) a hopper support conduit, said hopper support conduit being generally cylindrical in shape and having an open top and an open bottom, said hopper support conduit also being tapered such that the top of said hopper support conduit is a larger diameter than the bottom of said hopper support conduit, said bottom of said hopper support conduit having the same dimensions as the vent in said transition sleeve, said hopper support conduit and said transition sleeve being fixedly attached at the vent of said transition sleeve and the bottom of said hopper support conduit, forming a venturi at said junction of said transition sleeve and said hopper support conduit;
   (d) a hopper having an open top and an open bottom and a continuous cylindrical wall, and having the same diameter as the top of the hopper support conduit, said hopper being fixedly attached to the top of said hopper support conduit such that the combination of the base, transition sleeve, hopper support conduit and hopper form a continuous open channel for the flow of air therethrough;
   (e) a grate placed within the bottom said hopper to support the wood pieces;
   (f) a heat shield, formed around said hopper to induce a cooling air flow to prevent overheating the hopper wall;
   (g) a removable lid, said lid being placed on the top of the hopper to restrict the flow of air through the hopper once the wood pieces have been ignited; and
   (h) vent means placed in said lid to control the flow of air through the lid.

7. The charcoal maker of claim 6 further comprising a handle fixedly attached thereto.

8. The charcoal maker of claim 7 further comprising a handle fixedly attached to said lid.

9. The charcoal maker of claim 6 wherein said heat shield further comprises a flared top and a flared bottom, each extending outwardly from the heat shield to further control the air flow therethrough.

10. The charcoal maker of claim 6 wherein said hopper support conduit includes a second venturi means.

11. The charcoal maker of claim 10 wherein said second venturi means includes a rolled wall portion of the hopper support conduit.

12. The charcoal maker of claim 10 wherein the hopper support conduit includes a restricted portion between said first and second venturi.

* * * * *